United States Patent [19]

Mino et al.

[11] 3,756,695

[45] Sept. 4, 1973

[54] OPTICAL LOW-PASS FILTER

[75] Inventors: Masayuki Mino; Yokio Okano, both of Sakai-shi, Osaka-fu, Japan

[73] Assignee: Minolta Camera Kabushiki Kaisha, Osaka-fu, Japan

[22] Filed: July 12, 1971

[21] Appl. No.: 161,454

[30] Foreign Application Priority Data
July 14, 1970 Japan.............................. 45/61020
Nov. 14, 1970 Japan.............................. 45/99812

[52] U.S. Cl.......... 350/162 SF, 178/5.4 ST, 350/205
[51] Int. Cl............................................ G02b 27/38
[58] Field of Search................. 350/162 SF, 205, 350/314; 178/5.4 ST

[56] References Cited
UNITED STATES PATENTS

| 3,681,519 | 8/1972 | Larsen et al............... 350/162 SF X |
| 3,045,530 | 7/1962 | Tsujiuchi................ 350/162 SF UX |
| 3,606,542 | 9/1971 | Kirk et al..................... 350/162 SF |
| 2,959,105 | 11/1960 | Sayanagi......................... 350/314 X |
| 3,370,268 | 2/1968 | Dobrin et al........... 350/162 SF UX |

FOREIGN PATENTS OR APPLICATIONS

| 874,462 | 8/1961 | Great Britain.................. 350/162 R |

Primary Examiner—John K. Corbin
Attorney—Stanley Wolder

[57] ABSTRACT

An optical low-pass filter which is inserted in an image forming optical system in order to attain the response to zero in a frequency over the cut-off frequency and which is adapted so that the response in said optical system may not undergo a change depending upon the variation of F-number of the optical system. The filter gives a blur to all images formed by said image forming optical system, and is composed of phase elements provided on a transparent base plate. The phase elements are disposed systematically on a base plate for giving the phase difference to the wave front of light ray incident upon said transparent base plate.

14 Claims, 13 Drawing Figures

INVENTOR.
MASAYUKI MINO
YOKIO OKANO

BY Stanley Wolder
ATTORNEY

OPTICAL LOW-PASS FILTER

BACKGROUND OF THE INVENTION

The present invention relates to an optical low-pass filter and more particularly relates to an optical low-pass filter which gives a blur to the images formed by the image forming optical system, and which has regularly disposed phase elements for giving the phase retardation to incident wavefront.

In a single image tube type color television camera or a color television camera making use of two image tubes, a color encoding stripped filter is put to use for attaining the color informations. In the image forming optical system in said color television camera, the image is required to have the blur determined by the pitch of the stripped filter in all photographic distances.

Therefore, said optical system necessitates to provide an optical low-pass filter having a cut-off frequency determined by the striped filter. The requirements for the optical system provided with said optical low-pass filter are as follows:
1. the response of the optical system is zero in a frequnecy region over the cut-off frequency;
2. the response in the optical system does not undergo a change depending upon the variation of the F-number of the optical system.

As a low-pass filter for meeting said requirements it has been known to place a polyhedron prism on the pupil plane of an optical system. Such an optical low-pass filter meets well said requirements (1), (2), however, it is difficult to place it correctly on the optical pupil plane and also it is very difficult to mold such a polyhedron prism and polish it, so that the practical use is limited of itself.

In other words, provided the optical low-pass filter for meeting said requirements (1), (2) can be manufactured simply and easily, the performance of the color television can be remarkably improved.

OBJECT OF THE INVENTION

One object of the present invention is to provide an optical low-pass filter which is placed in an optical system in order to attain the response in said optical system to zero in a frequency region over the cut-off frequency, and which does not change the response in said optical system depending upon the variation of the F-number of the optical system, and which is simple and easy in manufacturing.

Another object of the present invention is to provide an optical low-pass filter which attains the object mentioned above by making use of a phase plate which has phase elements disposed systematically.

The other objects of the present invention will be cleared in the detailed description disclosed hereinafter.

SUMMARY OF THE INVENTION

In order to attain the objects mentioned above, the present invention relates to an optical low-pass filter which is composed of a transparent base plate and transparent phase elements disposed systematically on said transparent base plate for giving phase difference $\delta$ to the wavefront of light ray incident upon said transparent base plate.

Further, the relation between the phase difference $\delta$ and area ratio $q$, determined by the ratio of the whole area without the phase elements to the whole area with phase elements, satisfies following inequalities:

$$\cos \delta \geq 1 \quad 1, \quad q \geq 1$$
$$\cos \delta \leq 1 - 0.35 (q + 1)$$
$$\cos \delta \geq 1 - 0.65 (q + 1)$$

The relation of said area ratio and phase difference in the present invention holds the response over the cut-off frequency between −0.3 and +0.3. Provided the phase plate which satisfies above relations is put to use as a low-pass filter in the optical system for a color television camera, it improves the performance of the optical system for the color television camera.

BRIEF DESCRIPTION OF THE DRAWINGS

FIGS. 2a and 2b are diagrams showing the intensity distribution on the image plane of the optical low-pass filter of said embodiment, wherein FIG. 2A shows the case of that the ratio of line width is 1 : 2 and FIG. 2B shows the case of that said ratio is 1 : 3.

DESCRIPTION OF THE PREFERRED EMBODIMENT

With reference to the accompanying drawings the present invention will be described hereinafter. FIGS. 1 through 6 show the first embodiment in accordance with the present invention, in which rectangular wave phase elements whose profile are rectangular are disposed on a base plate.

Figure 1:
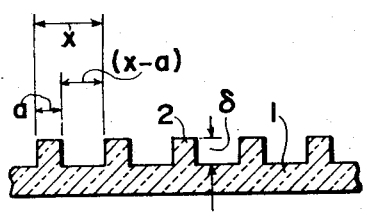
FIG. 1 is a side view of one embodiment in the present invention, in which rectangular phase elements are disposed on base plate.

To simplify the explanation a one-dimensional embodiment will be described hereinafter. That is, FIG. 1 is a side view in section of the rectangular wave phase grating, wherein the laminae 2 (phase elements) are disposed on the base plate 1 at the same period. Hereupon, provided that the width of lamina 2 is a and the grating period is X, the width without lamina is X − a. And, the optical height of the lamina, namely, the phase difference is supported to be $\delta$.

Now, provided that said rectangular wave phase grating is placed on the pupil plane in the aberration free image forming optical system and that the size of grating is widened infinitely the line spread function (LSF) In, defined by the irradiance distribution in the image plane of a line source, of the optical system is represented by the square of Fourier series of the phase grating, therefore, $$In = ]\sin n\pi/n\pi - \sin n\pi(a/X)/n\pi]^2 + [\sin n\pi(a/X)/n\pi]^2 + 2\cos \delta[\sin n\pi/n\pi - \sin n\pi(a/X)/n\pi][\sin n\pi(a/X)/n\pi] \quad (1)$$

wherein $n=0, \pm 1, \pm 2, \ldots$.

That is, the LSF becomes one-dimensional discrete function in accordance with the value of $n$. Therefore the discretely blurred image of a line source is formed in the image plane. Provided that the focal length of the lens is $f$, the wave length of light is $\lambda$, and the coordinate on the image plane is U, intensity In is spread to a position separated so far as $U=nf\lambda/X \ldots (2)$ from the geometrical focus represented by $n=0$. Therefore the shape of blurred image does not depend upon the F-number of the lens.

Figure 2A:
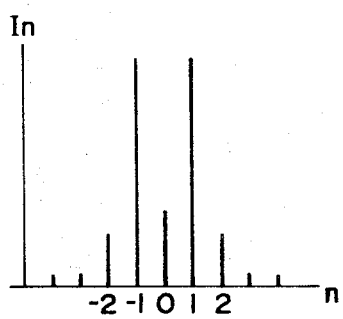
Figure 2B:
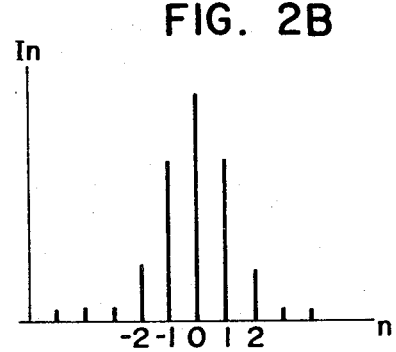

On the other hand, intensity In corresponding to $n=0$, $\pm 1, \pm 2$ is, as seen from Formula 1, changed in accordance with phase difference $\delta$ of the phase grating and the ratio $a/X$ of period X to width $a$ of lamina 2. As an example, the intensity distribution in the case of that $\delta=\pi$, $a/X = 1/3$, $a/X = 1/4$, is shown in FIG. 2A, FIG. 2B, respectively. In this case, the ratio of line width, defined by the ratio of width $a$ of lamina to width without lamina (X−a), is 1 : 2 and 1 : 3. And, even in the case that the ratio of said $a : (X − a)$ is reversely turned to 2 : 1 and 3 : 1, as seen clearly from Formula 1 the intensity distribution is quite the same as in FIG. 2A and FIG. 2B.

In the following description the case of $a < X − a$ is explained, however, also in the case of $a > X − a$ the same result can be obtained as described above.

Figure 3:
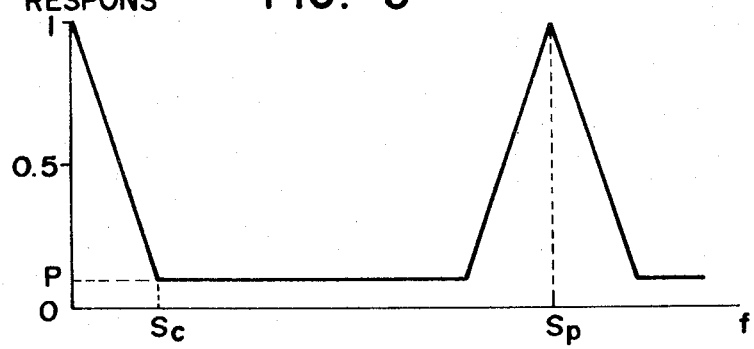
FIG. 3 is a diagram showing the response in the optical low-pass filter of said embodiment.
Figure 4:
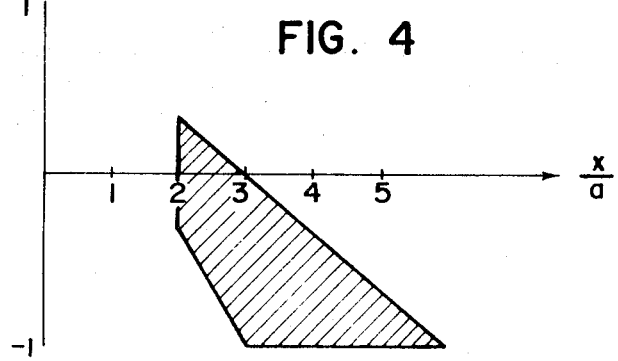
FIG. 4 is a diagram showing the allowable range between the optical hight of the rectangular wave phase element and the ratio of the period to element width in said embodiment.

By selecting properly phase difference $\delta$ of the rectangular wave phase grating, period X, and width $a$ of lamina 2 for the focal distance of the lens used, it is possible to give a one-dimensional blur to images. On the other side, in the case of that the LSF is as shown by Formula 1. the response becomes triangular wave as shown in FIG. 3. Since the LSF is discrete function, the response becomes periodic and has the peak in the high frequency region. The response decreases linearly to a cut-off frequency and has the Sc level $p$. The requirement of said low-pass filter is that the value of the response must become zero in a frequency over the cut-off frequency. When the Sc level $p$ is within the range $−0.3 \leq p \leq 0.3$, the performance as the low-pass filter is within the allowable range in practical use.

There are various kinds of combinations of the phase difference $\delta$, period X and width $a$ of lamina. The combination of phase difference $\delta$ and X/a shown by hatched area in FIG. 4, which satisfies the following inequalities, satisfies $−0.3 \leq p \leq 0.3$:

$\cos \delta \geq 1$
$X/a \geq 2$
$\cos \delta \leq 1 − 0.35 X/a$
$\cos \delta \geq 1 − 0.65 X/a$ By the way, $X/a = 2$ represents the ratio of line width 1 : 1 and $X/a = 3$ represents the ratio of line width 1 : 2 ( 2 : 1 ).

The cut-off frequency Sc of the response is given by $Sc = a/f\lambda$. Therefore, provided that the out-off frequency Sc is given, width $a$ of lamina can be determined by th4 focal length f of a lens and wave length $\lambda$.

Figure 5:
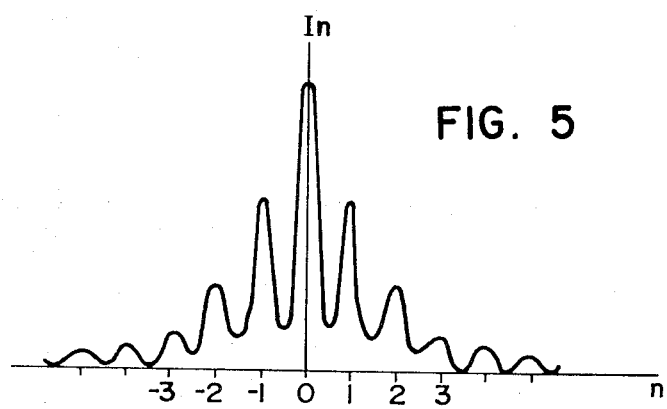
FIG. 5 is a diagram showing the intensity distribution on the limited spread of the rectangular wave phase grating of said embodiment.

In the above description the grating is suposed to be infinitely large, however, in an actual optical system the grating can not be infinitely enlarged and is restricted by the aperture. One example of the LSF is shown in FIG. 5, when the grating is restricted by the aperture. The intensity In corresponding to $n = 0, \pm 1, \pm 2$ will have the width as shown in FIG. 5. Therefore, the peak value of response in frequency Sp in FIG. 3 gets lower and accordingly rather desirable as a low-pass filter.

Figure 6:
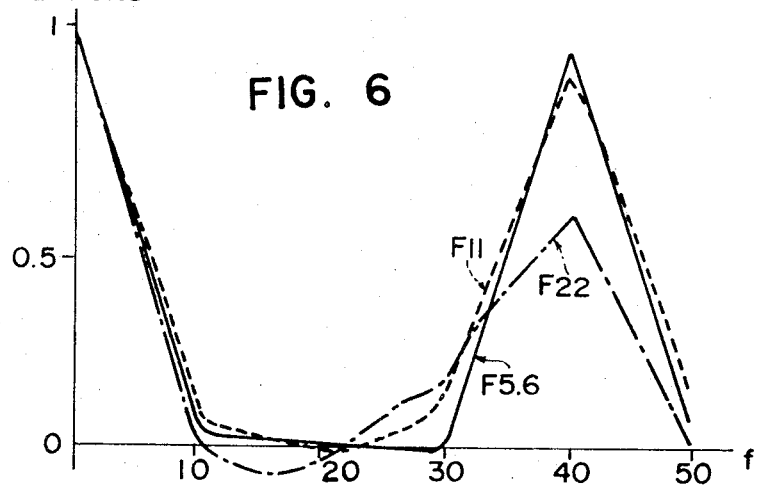
FIG. 6 is a diagram showing the response in the optical low-pass filter in said embodiment, when the F-number of the image forming lens is changed.

Next, it is considered that the F-number of an optical system is varied. If the aperture contains two periods of the grating or the smallest aperture, the performance as an optical low-pass filter is enough displayed. This fact is proved through the experiment. As a materialized example, the response for varying F-number is calculated under the condition that the period X of rectangular wave phase grating = 1.2 mm, the width $a$ of lamina 2 = 0.3 mm, the phase difference $\delta = \pi$, the focal distance $f$ of lens in optical system = 60 mm, the wave length $\lambda = 0.5 \mu$. The results are shown in FIG. 6. In FIG. 6 in the case of that F-number is 22, the aperture contains about two periods of the grating. In the case of F=22, the response on the high frequency region gets merely lower as shown by the chain line in FIG. 6 and is enough as an optical low-pass filter.

The response in FIG. 6 is obtained by a monochromatic light, however, in practical use a white light is put to use and yet used in a lens system in which the aberration remains. In such a case, the same effect as in the case that the grating is of the limited size is obtained and the intensity In has a width as shown in FIG. 5 and thereby the response value on the high frequency side shown in FIG. 3 is lowered. Since the peak value in frequency Sp in FIG. 3 is lowered, it is not necessary to consider the peak at the frequency Sp. Therefore the grating satisfies the requirements of said low-pass filter.

Figure 7:
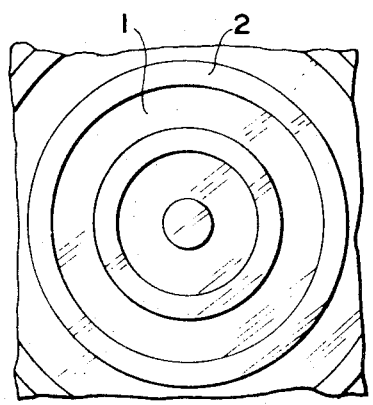
FIG. 7 is a top view of a two-dimensional embodiment in said embodiment.

The above description is made on the one-dimensional rectangular wave phase grating for the purpose of simplifying. However, in the case of two-dimensional rectangular wave phase grating, as shown in FIG. 7 by forming into rectangular wave phase grating in the concentric circular form. Provided the sectional formation including the center is shown in FIG. 1, it is possible to form a two-dimensional low-pass filter for satisfying the requirement as said low-pass filter.

Figure 8:
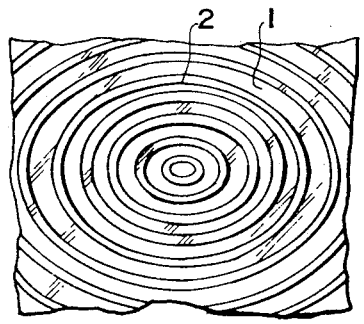
FIG. 8 is a top view of a modified embodiment of said embodiment.

In the same manner, as shown in FIG. 8 by forming into a rectangular wave phase grating in the elliptical form it is also possible to form into an optical low-pass filter different in the effect depending upon the direction.

When fitting a low-pass filter in accordance with the rectangular wave phase grating of the present invention in a lens system, in the case of a phase grating in the central symmetry as shown in FIG. 7 and FIG. 8 it is most suitable to place on the pupil plane of lens. However, in the other cases it is possible to place not only on the pupil plane of lens but also in an optional position and also in the first half lens portion of the lens system or between the lens system and the image plane. In the case of inserting between the lens system and the image plane, in accordance with the ratio of the diameter of lens to the diameter of light flux at the insertion position it is only required to change similarly period X of the phase grating and width $a$ of lamina 2. Accordingly restrictions for insertion position of low-pass filter are gone away.

In FIG. 1, base plate 1 and lamina 2 are shown as a homogenous material. However, if the both materials are transparent, a heterogeneous material can be used. The rectangular wave phase grating can be manufactured by evaporating magnesium fluoride or the like onto glass base plate 1 to form lamina 2. And, it is also possible to evaporate a lamina on a lens which is used as a base plate.

By replacing the ratio $X/a$ with the area ratio $q$, determined by the ratio of the whole area without laminae to the whole area with laminae, the following formula is obtained:

$$X/a = [a + (X - a)]/a = 1 + q$$

Therefore, said requirement $X/a \geq 2$ turns to:

$$1 + q \geq 2,$$
$$q \geq 1$$

And, the requirement $\cos\delta \leq 1 - 0.35\, X/a$ turns to:

$$\cos\delta \leq 1 - 0.35\,(q + 1)$$

Further, the requirement $\cos\delta \geq 1 - 0.65\, X/a$ turns to:

$$\cos\delta \geq 1 - 0.65\,(q + 1)$$

In this case, as a matter of course the laminae 2 are required to be disposed systematically relative to the X direction.

Figure 9:
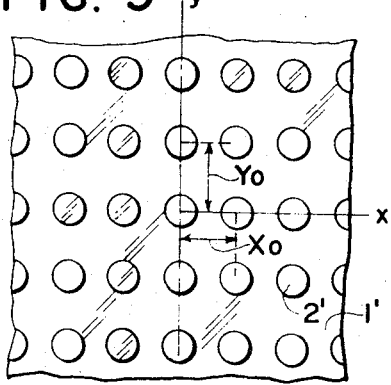
FIG. 9 is a top view of another embodiment in accordance with the present invention.
Figure 10:
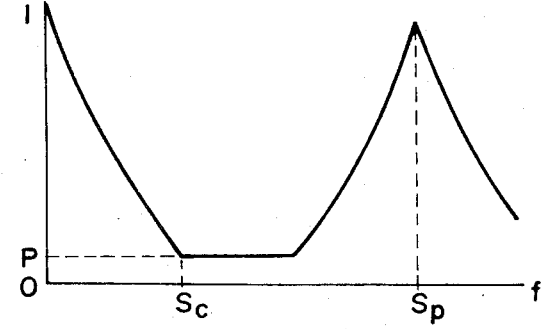
FIG. 10 is a diagram showing the relation between the response in the X direction in FIG. 9 and the frequency in the optical low-pass filter in said embodiment.

For a low-pass filter having such a requirement one example is shown in FIG. 9, which will be described hereinafter with reference to the drawings. First of all, on the case of that on transparent base plate 1' circular transparent spots 2' (phase elements) for giving phase difference $\delta$ are systematically disposed, the principle thereof will be described. Now, suppose that $x$, $y$ coordinates are taken on said low-pass filter, the period of spots 2' in the $x$ direction is $X_o$, the period of spots in the $y$ direction is $Y_o$, and the diameter of spot 2' which gives a phase difference $\delta$ is $a'$. Provided infinitely large low-pass filter is placed in an aberration free lens system, the response function of the optical system including said low-pass filter is as shown in FIG. 10. In general, an optical system has the two-dimensional response. However, it is difficult to show the two-dimensional directions so that as one example FIG. 10 shows the response in the $x$ direction. The response of said low-pass filter has the following properties I. the cut-off frequency $Sc$ shown in FIG. 10 is as follows as described hereinbefore:

$$Sc = a'/b \cdot \lambda \tag{3}$$

wherein $b$ is the distance between the low-pass filter and the image plane and $\mu$ is the wave length of light.

II. As the low-pass filter shown in FIG. 9 has a periodic structure, the response has the peak value on the high frequency side as shown in FIG. 10. The frequency $Sp$ in which the peak value comes out is as follows:

$$Sp = X_o/b \cdot \lambda \tag{4}$$

III. The $Sc$ level $p$ which response gets to a constant value in a frequency over the cut-off frequency $Sc$ in FIG. 10 is varied in accordance with the area ratio $q$ of the area of spot 2' to the area of the other portion and the phase difference $\delta$. The relation among said $p$, $q$ and $\delta$ is as follows:

$$\cos\delta = 1 - [(1-p)/2]\,(q + 1) \tag{5}$$

wherein the area ratio $q$ signifies that when the area of spot 2' is unity, the area of the other portion is defined as $q$, and $q \geq 1$.

The low-pass filter in accordance with the present invention has the properties mentioned above. In the case of that this filter is put to use in the optical system of a color television camera making use of a color encoding striped filter, an example is as follows. If the cut-off frequency determined by the striped filter is 8 lines/mm and if the low-pass filter is placed in the position separated 30 mm from the image plane, the diameter $a$ of the spot becomes about 0.12 mm for $\lambda = 0.5$ $\mu$ as seen from Formula 1. Further, in order to make $p = 0$, as seen in Formula 3, provided the relation between $q$ and $\delta$ satisfies $\cos\delta = 1 - 0.5\,(q + 1)$, the desired low-pass filter can be obtained.

In principle, it is enough to do as described above. However, by the proper choice of diameter $a$ of the spot, phase difference $\delta$, and area ratio $q$ in accordance with the purpose the desired low-pass filter can be obtained.

When putting the low-pass filter of the present invention to use in practice, as described above it must be considered that the low-pass filter is in a limited dimension, the aberration of lens system remains and the use is in the white light. However, these conditions for the practical use have only an effect to lower the response value at $Sp$ in FIG. 10 and give no effect upon the performance of the low-pass filter for a color television camera. Accordingly in practical use there is little need of considering the peak value at $Sp$. On the other hand, the $Sc$ level $p$ of the response is determined by Formula 3, and in a color television camera there is no need of being strictly $p = 0$. Provided it is within the range of $-0.3 \leq p \leq 0.3$ in practical use the performance thereof is enough displayed. In this case the relation between $\delta$ and $q$ is as follows:

$$\cos\delta \geq -1, \quad q \geq 1$$
$$\cos\delta \leq 1 - 0.35\,(q \pm 1)$$
$$\cos\delta \geq 1 - 0.65\,(q + 1)$$

Provided the combination is that of $\delta$ and $q$ within the range for satisfying all relations of the above formulas there is no harm in practical use. That is, the same result as in the embodiment described before can be obtained.

Figure 11:
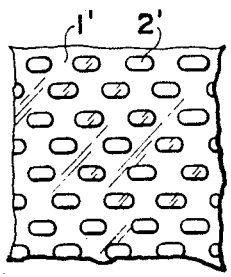
FIG. 11 is a top view of another embodiment in accordance with the present invention.
Figure 12:
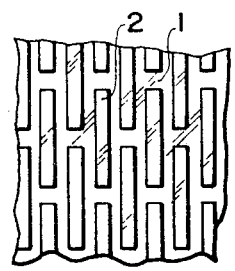
FIG. 12 is a top view of still another embodiment in accordance with the present invention.

The above description has been done on the response in the $x$ direction in FIG. 9. However, it is applied not only to the $x$ direction but also to all directions including the $y$ direction. That is, the cut-off frequency $Sc$ is determined by the diameter $a'$ of spots and the frequency $Sp$ is determined by the period of the spot. Therefore, provided the spot is of elliptical shape, the cut-off frequency is varied depending upon the direction. Further the shape of spot may be thinkable of various shapes such as a triangle, a square, a pentagon, etc. On the other hand, frequency $Sp$ for giving the peak value of the response on the high frequency side is determined by the arrangement of spots. There are various types of arrangements as shown in FIG. 9, FIG. 11, and FIG. 12.

The properties of the low-pass filter in accordance with the present invention are not related to the focal length of the lens used as shown in Formulas 3, 4 but related to the distance b between the low-pass filter and the image plane. Provided the distance b is left to be constant the cut-off frequency is always constant regardless of the object distance.

Provided at least two periods are contained in the aperture, the performance as a low-pass filter is enough displayed and the cut-off frequency is constant for the variation of the F-number. As described above, the low-pass filter is accordance with the present invention is effective as a low-pass filter for a color television camera making use of a color encoding striped filter.

In addition, since the low-pass filter according to the present invention is not required to place on the pupil plane in a lens system, it is possible to place in an optional position in the lens system. Accordingly provided the distance b between the image plane and said low-pass filter is left to be constant it is possible to use the various kinds of lenses, such as a wide angle lens, a telephoto-lens, a zoom lens, or the like. The low-pass filter according to the present invention gives only the phase difference to the wavefront and has no loss of the transmitted light level.

The manufacturing of said low-pass filter is as follows For example, in order to give the phase difference $\delta$ to spots systematically disposed it is possible to manufacture easily by applying a vacuum evaporation of magnesium fluoride or the like onto a glass base plate used as a filter or an optional lens surface for constituting a lens system. Since it is enough to give the phase difference $\delta$ to the wavefront, a material for giving the phase difference $\delta$ may be evaporated on the area without spots.

The low-pass filter according to the present invention is not limited to the use in the optical system in a color television camera and can be used for various purposes such as removing moire in the photoengraving printing.

What is claimed is:

1. An optical low pass filter comprising:
a transparent support and a plurality of optical elements disposed on said support for introducing phase retardation in light transmitted through the filter,
each of said optical elements having, an upper surface and a side surface perpendicular thereto, said optical elements being so arranged that the section of one side of the filter taken along in at least one direction is the shape of rectangular wave in which the width of each projection and the space between adjoining projections are respectively equal to each other,
and each of said optical elements being of a size to provide phase retardation $\delta$ selected from the range given by the following formula $\cos\delta \geq -1, 1 - 0.35(q+1) \geq \cos\delta \geq 1 - 0.65(q+1)$ wherein the character $q$ is the ratio equal to the total sum of areas not covered by said optical elements divided by the total sum of areas covered by said optical elements, said ratio being not less than 1.

2. AN optical low pass filter as set forth in claim 1, wherein said plurality of optical elements for introducing phase retardation are composed of the a number of spots of the same shape and the same dimensions which are formed on said transparent support.

3. An optical low pass filter as set forth in claim 2, wherein said spots are circular spots having the same diameters.

4. An optical low pass filter as set forth in claim 2, wherein said spots are oval spots having the same shape and dimension as each other.

5. An optical low pass filter as set forth in claim 2, wherein said spots are rectangular spots having the same shapes and dimensions.

6. An optical low pass filter as set forth in claim 1, wherein said plurality of optical elements for introducing phase retardation are composed of circular zones having the same width and arranged concentrically in the same intervals on said transparent support.

7. An optical low pass filter as set forth in claim 1, wherein said plurality of optical elements for introducing phase retardation are composed of oval zones having the same widths and arranged concentrically in the same intervals on said transparent support.

8. An optical low pass filter as set forth in claim 1, wherein said plurality of optical elements are composed of magnesium fluoride evaporated on a glass plate as the transparent support be means of vacuum evaporation.

9. The optical low pass filter of claim 1 wherein said transparent support is a lens.

10. An optical low pass filter comprising:
a transparent support and optical means disposed on said transparent support for introducing phase retardation to light transmitted through the filter;
said optical means having an upper surface and being so formed that the section of one side of the filter taken along in at least one direction is the shape of rectangular wave in which the width of each projection and the space between adjoining projections are respectively equal to each other;
and said optical means having the size in the direction perpendicular to the upper surface thereof to provide phase retardation $\delta$ selected from the range given by the following formula $\cos\delta \geq -1$
$\cos\delta \leq 1 - 0.35 (q+1)$
$\cos\delta \geq 1 - 0.65 (q+1)$ wherein th character $q$ is the ratio between the total sum of the areas on the upper surface of said optical means and the total sum of areas on portions not covered by said optical means on he transparent support, said ratio being selected to be not less than 1.

11. An optical low pass filter as in claim 10, wherein said optical means includes a number of slots formed thereon each having side walls perpendicular to said upper surface, and said character q is the ratio given by the following formula $$q = \frac{\text{Total sum of areas on each surface of said optical means}}{\text{Total sum of areas on portions not covered by said optical means}}$$

12. An optical low pass filter as in claim 10, wherein said optical means includes a number of transparent laminae so arranged on said transparent support to form a striped pattern and make the filter a phase grating.

13. An optical low pass filter comprising:
a transparent support and a plurality of optical elements disposed on said support for introducing phase retardation in light transmitted through the filter;

each of said optical elements being composed of a transparent lamina continuous in one direction and having a flat upper surface and side surfaces perpendicular thereto, said optical elements being arranged in parallel to each other so that the section of one side of the filter taken along in the direction normal to the longitudinal direction of the laminae is the shape of rectangular wave in which the width of each projection a and the space between adjoining projections are respectively equal to each other, and that a phase grating filter is defined;

and each of said optical elements being of a size to provide a phase retardation $\delta$ selected from the range given by the following formula.

$\cos\delta \geqq 1$
$\cos\delta \leqq 1 - 0.35\ (X/A)$
$\cos\delta \geqq 1 - 0.65\ (X/A)$ in which
$A = a$ (when $a \leqq X - a$)
$A = X - a$ (when $a \geqq X - a$)

and the character $X$ is the grating period of the stripe filter.

14. The optical low pass filter of claim 13 wherein said transparent support is a lens.

* * * * *